United States Patent
Miller et al.

(10) Patent No.: US 8,618,915 B2
(45) Date of Patent: *Dec. 31, 2013

(54) APPARATUS AND METHOD FOR INTEGRATING A TRANSMITTING DEVICE AND A BATTERY PACK

(75) Inventors: Robert Miller, Convent Station, NJ (US); Spencer White, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 629 days.

This patent is subject to a terminal disclaimer.

(21) Appl. No.: 12/646,172

(22) Filed: Dec. 23, 2009

(65) Prior Publication Data

US 2011/0148595 A1 Jun. 23, 2011

(51) Int. Cl.
*H04Q 5/22* (2006.01)

(52) U.S. Cl.
USPC .......................................... 340/10.4

(58) Field of Classification Search
USPC ................... 340/10.4, 10.5, 12.32; 429/7, 61; 455/41.1; 702/63
See application file for complete search history.

(56) References Cited

U.S. PATENT DOCUMENTS

| | | | |
|---|---|---|---|
| 6,380,845 B2 | 4/2002 | Tuttle | |
| 7,041,400 B2 * | 5/2006 | Kim et al. | 429/7 |
| 7,562,813 B2 * | 7/2009 | Humphrey et al. | 235/379 |
| 7,652,637 B2 * | 1/2010 | Taki et al. | 343/895 |
| 8,154,150 B2 * | 4/2012 | Sakai et al. | 307/9.1 |
| 2005/0079820 A1 * | 4/2005 | Yamashita | 455/41.2 |
| 2007/0008141 A1 | 1/2007 | Sweetland | |
| 2007/0135164 A1 | 6/2007 | Lee | |
| 2010/0161257 A1 | 6/2010 | Cornett et al. | |

* cited by examiner

*Primary Examiner* — Vernal Brown
(74) *Attorney, Agent, or Firm* — Wolff & Samson, PC

(57) ABSTRACT

An apparatus is provided that includes a processor mounted on a battery pack and a communication pathway from the processor to an electronic device comprising power battery contacts. The apparatus also includes an antenna mounted on the battery pack and coupled to the processor and adapted to transmit and receive data. A method is provided that includes installing an integrated chip including a processor and an antenna on a battery pack. The method also includes coupling the integrated chip and an electronic device when the battery pack is installed in the electronic device using power battery contacts. A high frequency signal superimposed on a direct current carried through the power battery contacts operates to send data between the processor and the electronic device.

15 Claims, 3 Drawing Sheets

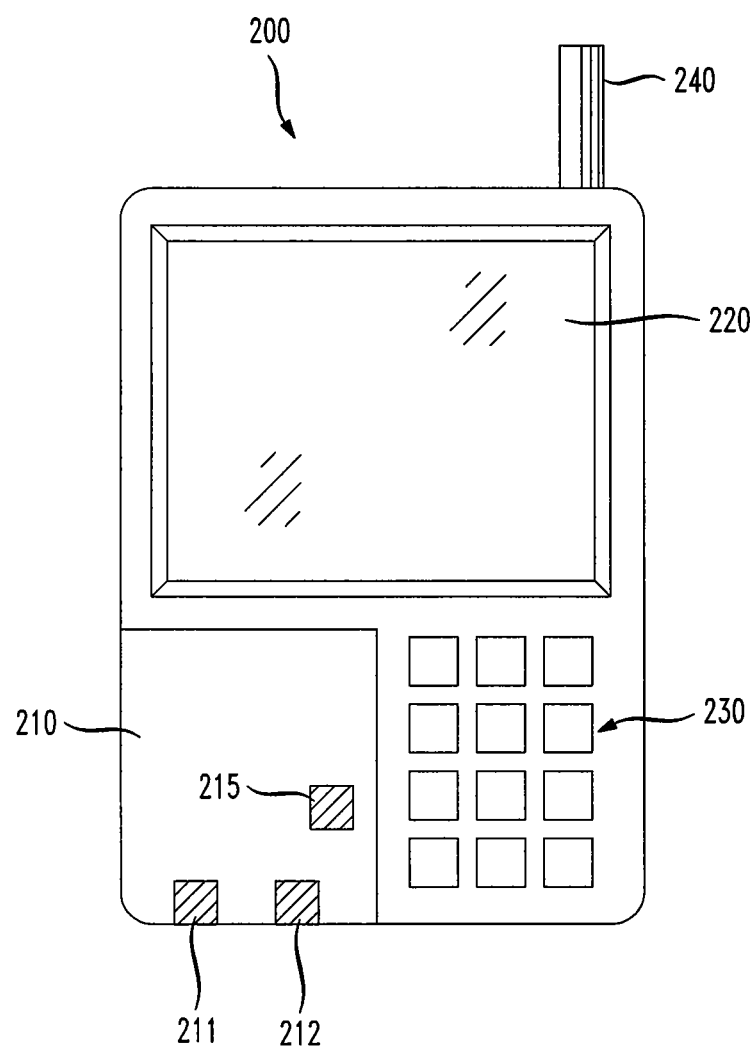

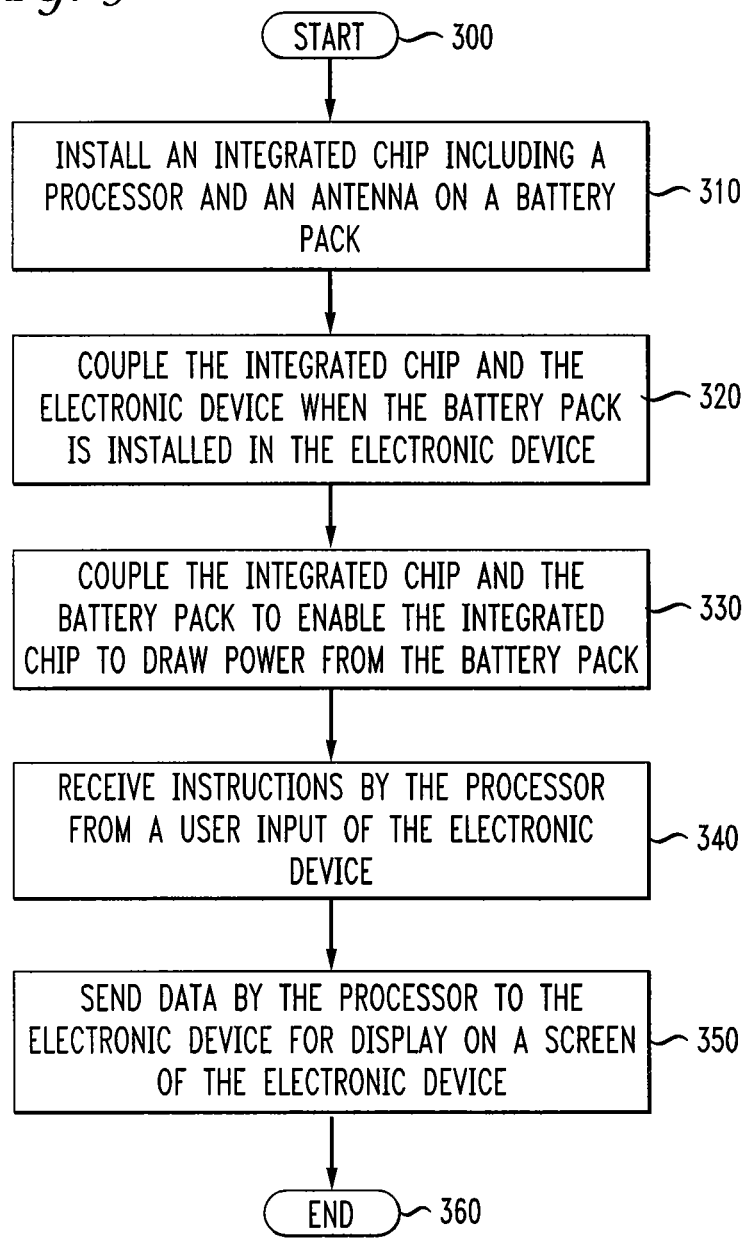

APPARATUS AND METHOD FOR INTEGRATING A TRANSMITTING DEVICE AND A BATTERY PACK

FIELD OF THE INVENTION

The present application relates to battery packs for electronic devices, and in particular relates to integrating a transmitter or RFID apparatus into a personal electronic device's battery pack.

BACKGROUND OF THE INVENTION

The use of Personal Area Networking (PAN) and RFID wireless interfaces is growing. Cell phones may act as an RFID reader/client in many applications such as electronic transactions, inventory, or medical monitoring, among others. These additional wireless interfaces may allow the phone's processor to communicate with the alternative hardware/software platforms other than the mobile phone platform.

Micro-SD cards, Mini-PCI, or other formats may be used to accomplish the PAN or RFID communication, however building the adjunct wireless-enabling circuits into a cell phone or other electronic device may be too expensive, and/or may reduce the phone user's ability to use a plug-in card for other applications.

Many PAN and RFID interfaces are engineered to the point of becoming chip radios: the entire stack is contained in a single, low-cost, low-power integrated circuit.

SUMMARY OF THE INVENTION

A method and apparatus are provided for instantiating RFID or other wireless connectivity into a cellular phone as an adjunct communication interface. The method and apparatus include combining the hardware supporting the chosen air interface into the battery pack, instead of building it into the phone itself or establishing the function by packaging the wireless hardware into a pluggable format. In this manner, overhead for the standardized package, software overhead, and power/complexity is avoided or reduced.

The method or apparatus allows the adjunct connectivity to be provided via a battery pack design that incorporates not only the storage cells, but also the chip radio and associated antenna.

An apparatus is provided that includes a processor mounted on a battery pack and a communication pathway from the processor to an electronic device comprising power battery contacts. The apparatus also includes an antenna mounted on the battery pack and coupled to the processor and adapted to transmit and receive data. A method for installing an RFID tag in an electronic device is provided that includes installing an integrated chip including a processor and an antenna on a battery pack. The method also includes coupling the integrated chip and the electronic device when the battery pack is installed in the electronic device using power battery contacts.

A high frequency signal superimposed on a direct current carried through the standard battery contacts operates to send data between the processor and the electronic device.

These and other advantages of the invention will be apparent to those of ordinary skill in the art by reference to the following detailed description and the accompanying drawings.

BRIEF DESCRIPTION OF THE DRAWINGS

FIG. 2 illustrates a system according to another exemplary embodiment; and

FIG. 3 illustrates a method according to a further exemplary embodiment.

DETAIL DESCRIPTION

Figure 1:
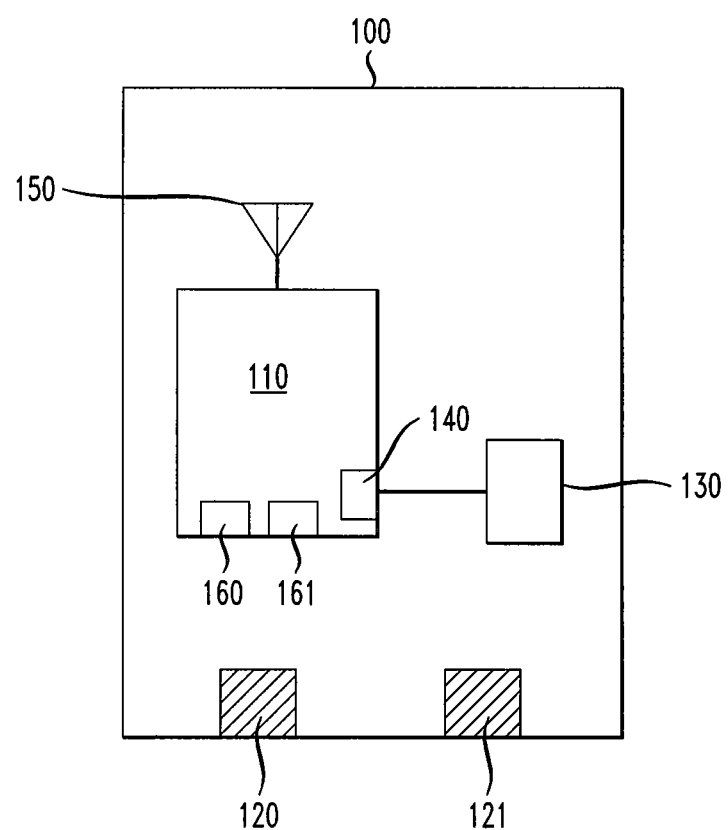
FIG. 1 illustrates a device according to a first exemplary embodiment.

The method or apparatus supports the design of economical cellular phones that either preserve the expensive SD-card slot for other user-added capabilities, or reduce cost by not requiring such slots to be implemented. Instead, the chip and antenna for a particular air interface (e.g. RFID) is built into the battery pack. Chip radios have been designed to fit into form factors such as credit cards, adding little height to the pack. Chip radios may be inexpensive, and this capability may add little to the cost of the battery pack. The cost may be lower than a standardized full Micro-SD card implementation. Moreover, if the user does not wish to use the adjunct interface feature, a regular battery pack can be substituted.

Since many interfaces that use Personal Area Networks (PAN) or RFID applications communicate infrequently at low power and with low transmission rates, use of battery power may not be an issue, as the cellular phone may pose a higher drain, even in standby. Moreover, the battery compartment of the phone is usually one of the least shielded areas in the phone's mechanical design, thereby improving antenna performance. The battery and cover may be situated close to the rear surface of the device, and therefore placing an antenna for RFID purposes may enable the antenna to be brought into close proximity to the surface of an RFID reader instrument or RFID-equipped object. For passive RFID-equipped objects, this arrangement may improve the coupling to the passive device's antenna, which in other situations may be a challenged link.

In order to permit communication with the devices mounted in the battery case, three mechanisms are possible: 1. add auxiliary battery contacts that allow digital information to flow to the enhanced battery pack, but do not allow information to flow to a conventional pack; 2. re-purpose/enhance smart battery packs that already have such connections for preventing counterfeit batteries from being used in devices, as these packs may pose human safety risks; or 3. multiplex communication using the battery power connections themselves. The present apparatus and method utilize the third alternative as a communication pathway.

This communication pathway may be implemented by sending the communication as a high-frequency carrier superimposed on the DC battery connection. The high frequency signal can be modulated to allow communication between the electronic device's processor and a wireless chip in the battery pack. The signal may be applied and extracted, respectively, via a power-separation filter that may consist of series inductors (which can substitute for the battery fuse within the battery to prevent the battery or power supply from attenuating the high frequency signals), and capacitors which provide a low impedance at high frequency to couple them to the data source and sink.

This device and method provides several important benefits related to hardware cost minimization in cell phones, and improvement of range/reliability of RF communication to devices such as RFID tags or readers.

Additional benefits include: 1. inexpensive addition to battery; 2. inexpensive to implement inside a phone (e.g. no SD-card cost/complexity overhead); and 3. a conventional or enhanced battery pack allows a user or provider to determine whether the wireless adjunct interface will be enabled. This system allows the incremental cost of the feature to be made variable according to application and user. It also provides a platform upon which to investigate willingness of third parties to subsidize the enhanced pack cost (for example, by a credit card company). Further benefits include: 4. the enhancement can be added at any time; 5. the enhancement may be usable for enhanced battery maintenance features in addition to the added wireless interface function; 6. the enhancement places antennas of the RFID or other wireless adjunct in the battery away from the cellular antenna and favorably positioned for low-loss RF illumination at the rear of the phone; 7. the optimum coupling position allows the GUI of the phone to be used concurrently, so the interaction can be tracked on the display and/or keypress input can be easily managed; and 8. electronic transactions frequently require storage/access to secure information which may be stored in encrypted form. The secure storage may be provided by a separate tamper-resistant chip in the battery pack, in the phone's removable SIM card, or within a suitably tamper-proofed memory resident in the phone itself.

In the apparatus, the antenna may be adapted to receive transmissions. The antenna may be further adapted to receive transmissions capable of powering the processor. The apparatus may operate as a radio frequency identification tag.

The apparatus may be used to communicate in a consumer transaction. The communication pathway may include auxiliary battery contacts and/or smart battery contacts.

The processor may be adapted to receive instructions from a user input of the electronic device, and the processor may be adapted to send data via the communication pathway to the electronic device for display on a screen of the electronic device.

The electronic device may for example be a mobile phone, a pager, a personal digital assistant, a personal music player and a game machine. The processor may be electrically coupled to the battery pack and receive power from the battery pack.

FIG. 1 illustrates a device according to an exemplary embodiment. Battery pack 100 may be used in an electronic device, and for example may be used in a mobile phone, pager, personal digital assistant, a personal music player, or a game machine. Battery pack 100 may include two contacts, power contacts 120 and 121, for providing power to the electronic device. Processor 110 may be integrated into battery pack 100 during production or as an after-market modification. Processor 110 may be an integrated chip or a chip stack (i.e., a multi-chip module of stacked dies of integrated circuits). In the case of processor 110 being an after-market modification of battery pack 100, processor 110 may have a low profile in order to avoid interfering with the placement of battery pack 100 in a battery receptacle of the electronic device. In the case of processor 110 being integrated into battery pack 100 during production, processor 110 may also be a low profile chip or chip stack, or alternatively may fit into a recess in battery pack 110's casing. In this manner, battery pack 100 including integrated processor 110 may be positioned in a battery receptacle of an electronic device without additional modification of the electronic device.

Processor 110 may be coupled to antenna 150, which may be used to transmit and/or receive. Processor 110 may be coupled to battery pack 100 via power contacts 160 and 161. In this manner, processor 110 may draw power from battery pack 100 for operation of processor 110 and/or for transmitting and receiving using antenna 150. Alternatively, antenna 150 may receive transmissions having sufficient power to operate processor 110. In the event that processor 110 is adapted to draw power from battery pack 100 via power contacts 160 and 161, processor 110 may be designed as a low power processor which may therefore not require significant power consumption. Processor 110 and antenna 150 may operate in a radio frequency band, and in particular may operate as a radio frequency identification (R.F.I.D.) tag. The RFID tag of processor 110 and antenna 150 may be part of either a passive or active RFID system, or alternatively may be part of another Personal/Local Area Network air interface, for instance, ZigBee or Wi-Fi.

In operating as an RFID tag or other short distance transmitting and receiving system, processor 110 and antenna 150 may engage in consumer transactions for a user of the electronic device having battery pack 100. For instance, the electronic device having battery pack 100 may be used to purchase food or other items at a vending machine by selecting the item via a vending machine or via an interface of the electronic device, and purchasing the item via a debit of an account using processor 110 and antenna 150. The account used for such a transaction may be managed by an operator of a vending machine, either locally or at a central location, and/or may be managed by processor 110. Additionally, an account used to fund such a transaction may be a debit, credit or pre-paid account.

Processor 110 may be coupled to an electronic device having battery pack 100 via contact 140, which may in turn couple to contact 130. Contact 130 may be situated on a surface of battery pack 100 such that when battery pack 100 is inserted into a battery case of electronic device, contact 130 contacts another contact of the electronic device. In this manner, processor 110 may have a signaling path to electronic device. Contact 130 may operate as part of a smart battery contact which may be used to identify the producer of a battery pack 100. Alternatively, contact 130 may be a custom contact designed for use with processor 110. In this case, contact 130 may couple to a contact in an electronic device having battery pack 100 for electronic devices designed to accommodate a battery pack 100 including a processor 110. In an exemplary embodiment, processor 110 may communicate with an electronic device having battery pack 100 via power contacts 120 and 121. Communication between processor 110 and the electronic device via power contacts 120 and 121 may be achieved by using a high frequency signal to carry the data between the electronic device and processor 110. The high frequency signal including the data may be superimposed on a DC current used to power the electronic device.

FIG. 2 illustrates another exemplary embodiment. Electronic device 200 may for example be a mobile telephone, pager, personal digital assistant, personal music player, or a game machine. Electronic device 200 may include battery receptacle 210 adapted to receive battery pack 100 shown in FIG. 1. Battery receptacle 210 may include power contacts 211 and 212 adapted to couple to power contacts 120 and 121 of battery pack 100. Additionally, battery receptacle 210 may include contact 215 coupled to contact 130 of battery pack 100 for delivering signals and/or data to processor 110. Electronic device 200 may include display 220 which may display information received from processor 110. Electronic device 200 may process the data received from processor 110 in another internal processor prior to displaying it on display 220. Electronic device 200 may include user interface 230 that may include buttons, and may also include a processor, memory and a data storage system. Additionally, or alternatively, display 220 of electronic device 200 may include a touch screen interface and may therefore function as a user interface. Electronic device 200 may include antenna 240 which may operate to connect electronic device 200 to a cell phone, Wi-Fi network, hot spot network, or any other appropriate network. User interface 230 may be operated to send instructions to processor 110 for controlling processor 110 and/or the transmissions and receptions of antenna 150.

A high frequency signal superimposed on a direct current carried through the standard battery contacts may operate to send data between the processor and the electronic device.

The method may include coupling the integrated chip and the battery pack to enable the integrated chip to draw power from the battery pack. The integrated chip may be powered by transmissions received by the antenna. The RFID tag may be used to communicate in a consumer transaction. The integrated chip and the electronic device may be further coupled by auxiliary battery contacts and/or smart battery contacts when the battery pack is installed in the electronic device.

The method may include receiving instructions by the processor from a user input of the electronic device, and sending data by the processor to the electronic device for display on a screen of the electronic device.

FIG. 3 illustrates an exemplary method. The flow in the method starts at start circle 300. From start circle 300, the flow proceeds to operation 310, which indicates to install an integrated chip including a processor and an antenna on a battery pack. From operation 310, the flow proceeds to operation 320, which indicates to couple the integrated chip and the electronic device when the battery pack is installed in the electronic device. Operation 310 may include coupling the integrated chip and the electronic device to communicate data via power battery contacts of the electronic device. From operation 320, the flow proceeds to operation 330, which indicates to couple the integrated chip and the battery pack to enable the integrated chip to draw power from the battery pack. From operation 330, the flow proceeds to operation 340, which indicates to receive instructions by the processor from a user input of the electronic device. From operation 340, the flow proceeds to operation 350, which indicates to send data by the processor to the electronic device for display on the screen of the electronic device. From operation 350, the flow proceeds to end circle 360. Operations 330, 340, and 350 are optional in the exemplary method. From the method in FIG. 3, the flow may include additional operations of powering up the wireless device; recognizing the wireless device as "present" by the processing device; and setting up a two-way communication link to allow the radio to be configured. The method of FIG. 3 may also include querying a status (e.g. signal strength and other important RF parameters); and using the wireless device for two-way transmission of information (including packet acknowledgements).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. An apparatus, comprising:
a processor mounted on a battery pack;
a communication pathway from the processor to an electronic device, the communication pathway comprising power battery contacts that carry a direct current from the battery pack to the electronic device, wherein the communication pathway carries data between the processor and the electronic device on the direct current; and
an antenna mounted on the battery pack and coupled to the processor, wherein the antenna transmits and receives data.

2. A method, comprising:
installing an integrated chip including a processor and an antenna on a battery pack; and
coupling the integrated chip and an electronic device when the battery pack is installed in the electronic device using a communication pathway comprising power battery contacts that carry a direct current from the battery pack to the electronic device, wherein the communication pathway carries data between the processor and the electronic device on the direct current.

3. The method of claim 2, wherein a high frequency signal superimposed on the direct current carried through the power battery contacts operates to send data between the processor and the electronic device.

4. The method of claim 2, further comprising coupling the integrated chip and the battery pack to enable the integrated chip to draw power from the battery pack.

5. The method of claim 2, further comprising powering the integrated chip by transmissions received by the antenna.

6. The method of claim 2, further comprising communicating by the antenna and the processor in a consumer transaction.

7. The apparatus of claim 1, wherein the processor and the electronic device are further coupled by auxiliary battery contacts when the battery pack is installed in the electronic device.

8. The apparatus of claim 1, wherein the processor and the electronic device are further coupled by smart battery contacts when the battery pack is installed in the electronic device.

9. The method of claim 2, further comprising:
receiving instructions by the processor from a user input of the electronic device; and
sending data by the processor to the electronic device for display on a screen of the electronic device.

10. A method comprising:
transmitting data through a communication pathway from a processor mounted on a battery pack to an electronic device, wherein the communication pathway comprises power battery contacts that carry a direct current from the battery pack to the electronic device;
receiving the data at an antenna mounted on the battery pack, wherein the antenna is coupled to the processor; and
transmitting the data via the antenna.

11. The method of claim 10, wherein transmitting data through a communication pathway comprises:
transmitting the data, through the communication pathway, between the processor and the electronic device using a high frequency signal superimposed on the direct current carried through the power battery contacts.

12. The method of claim 10 further comprising:
receiving transmissions at the antenna capable of powering the processor.

13. The method of claim 10, wherein transmitting data through a communication pathway comprises:
transmitting data associated with a consumer transaction.

14. The method of claim 10 further comprising:
receiving at the processor instructions from a user input of the electronic device; and
sending from the processor data based on the user input through the communication pathway to the electronic device for display on a screen of the electronic device.

15. The method of claim 10, further comprising:
receiving power at the processor from the battery pack.

* * * * *